S. S. COLE.
Corn Sheller.

No. 88,367.  Patented March 30, 1869.

Witnesses
A. Benneckendorf,
Ama Morgan.

Inventor
S. S. Cole.
per [signature]
atty

S. S. COLE, OF HENRYVILLE, INDIANA.

*Letters Patent No. 88,367, dated March 30, 1869.*

IMPROVEMENT IN CORN-SHELLER.

The Schedule referred to in these Letters Patent and making part of the same.

*To all whom it may concern:*

Be it known that I, S. S. COLE, of Henryville, Clarke county, Indiana, have invented a new and improved Corn Sheller; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved corn-sheller, which shall be so constructed and arranged as to do its work quickly and thoroughly, while at the same time it may be manufactured at small expense, and thus brought within the reach of all farmers, even those of limited means; and It consists in the revolving perforated shelling-cylinder, provided with interior teeth, or cogs, and having a crank attached to one end, in combination with the box in which said cylinder works, as hereinafter more fully described.

A is a close box, having a hole, or opening in its bottom, for the escape of the shelled corn, and which is designed to be attached to a frame-work, bench, table, or other support, having an opening, to allow the shelled corn to pass through into a sack, barrel, or other receptacle, so placed as to receive the shelled corn.

B is a hollow cylinder, which revolves in bearings in the box A.

Figure 1:
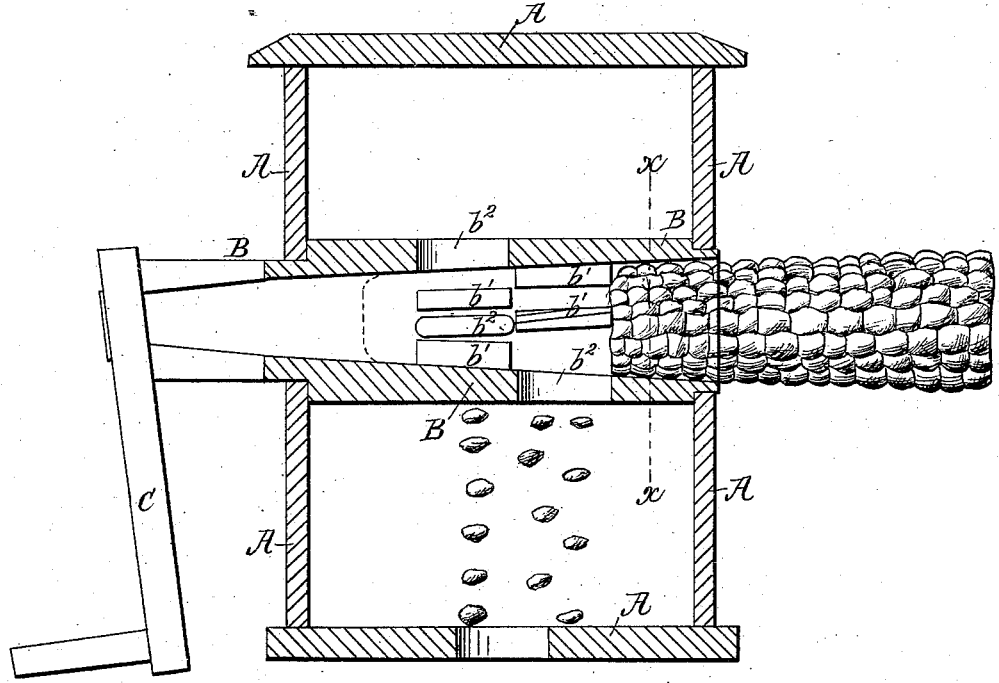
Figure 1 is a vertical longitudinal section of my improved corn-sheller.
Figure 2:
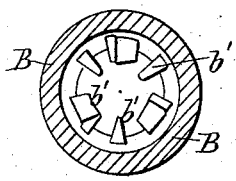
Figure 2 is a detail cross-section of the shelling-cylinder, taken through the line $x\,x$, fig. 1.

$b^1$ are cogs, teeth, or shelling-knives, which are securely attached to the body of the hollow cylinder B, so as to project upon its interior, as shown in figs. 1 and 2.

The cogs, or teeth $b^1$, I prefer to set in an inclined position, so that they may act more advantageously upon the corn, and so that their tendency may be to draw the ear inward.

The kernels, as they are removed from the cob, pass through holes, or openings, $b^2$, in the cylinder B, into the lower part of the box A, and thence into the sack, barrel, or other receptacle prepared to receive them.

To one of the projecting ends of the cylinder B is attached a crank, C, by means of which the said cylinder is operated.

The crank C should be attached to the cylinder B in such a way as to allow the cob to pass entirely through the said cylinder, when desired.

In using the machine, the end of the ear to be shelled is inserted in the end of the cylinder B, opposite the crank C, with one hand, while the said crank C is operated with the other hand, the said ear being held against its tendency to be carried around with said cylinder, by the grasp of the hand. When the ear has been half shelled, it is removed, and its other end inserted, to complete the shelling.

When the shelling has been completed, the cob may be withdrawn from the cylinder B, and thrown to one side, or it may be allowed to pass through the cylinder B, and thus out of the machine, while another ear is being inserted for shelling.

I claim as new, and desire to secure by Letters Patent—

An improved corn-sheller, formed by the combination of the hollow cylinder B, made with one or more lateral openings, $b^2$, through its body, provided with internally-projecting cogs, or teeth $b^1$, and having a crank, C, attached to one of its ends, with the box A, substantially as herein shown and described, and for the purpose set forth.

S. S. COLE.

Witnesses:
JOHN BAMBER,
JACOB BOLLINGER.